April 28, 1953     J. C. SINGLETON, JR     2,636,813
APPARATUS FOR BURNING WASTE LIQUOR Filed May 2, 1947     4 Sheets-Sheet 1

INVENTOR
John C. Singleton, Jr.
BY
ATTORNEY

April 28, 1953     J. C. SINGLETON, JR     2,636,813
APPARATUS FOR BURNING WASTE LIQUOR
Filed May 2, 1947                                4 Sheets—Sheet 2

INVENTOR
John C. Singleton, Jr.
BY
ATTORNEY

April 28, 1953 — J. C. SINGLETON, JR — 2,636,813
APPARATUS FOR BURNING WASTE LIQUOR
Filed May 2, 1947 — 4 Sheets-Sheet 3

INVENTOR
John C. Singleton, Jr.
BY J. P. Moran
ATTORNEY

April 28, 1953    J. C. SINGLETON, JR    2,636,813
APPARATUS FOR BURNING WASTE LIQUOR
Filed May 2, 1947    4 Sheets-Sheet 4
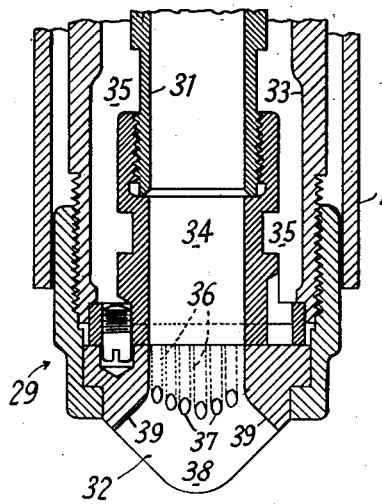
INVENTOR
John C. Singleton, Jr.
BY
J. P. Moran
ATTORNEY Patented Apr. 28, 1953

2,636,813

UNITED STATES PATENT OFFICE 2,636,813

APPARATUS FOR BURNING WASTE LIQUOR

John C. Singleton, Jr., Watchung, N. J., assignor to The Babcock & Wilcox Company, New York, N. Y., a corporation of New Jersey Application May 2, 1947, Serial No. 745,598

5 Claims. (Cl. 23—277)

The present invention relates in general to the recovery of chemicals and/or heat from waste liquors containing inorganic chemicals and combustible organic matter, and more particularly, to a method and apparatus whereby such recovery is effected as a result of burning a concentrated pulp digester residual liquor derived from various pulping processes, such as the sulphate, soda, or sulphite processes, wholly or partly in suspension in a suitable furnace.

In burning sulphate residual liquor, for example, the concentrated residual liquor may be introduced into the upper part of the furnace chamber and directed so as to provide dehydration of the sprayed liquor, distillation of volatiles, and at least partial combustion while in transit to the furnace floor or hearth. The resultant char is allowed to accumulate to a substantial depth on the hearth and is burned by primary air streams directed into the bed. The char bed also acts as a reducing medium for the reduction of the inorganic chemicals, such as sodium sulphate to sodium sulphide, and the temperatures within the bed permit the withdrawal of the chemicals in a molten condition.

In burning a calcium base sulphite liquor, and particularly "semi-chemical" sulphite residual liquor, the only usable chemical which can be recovered is the sulphur constituent of the liquor. Accordingly it has been proposed that the liquor be introduced in a finely atomized condition and a highly oxidizing atmosphere maintained in the furnace chamber, while the combustible constituents of the liquor are burned mainly in suspension. Under such conditions, the sulphur constituent combines with oxygen in the furnace atmosphere to form sulphur dioxide which passes out of the furnace chamber with the other furnace gases and can be economically recovered in the usual gas absorption towers for this purpose. The incombustible residue of the liquor is periodically removed from the furnace bottom in any suitable manner.

In soda residual liquor the included chemicals are mainly sodium carbonate and a small amount of sodium sulphate. In the normal operation of a soda recovery furnace, the concentrated liquor is sprayed into the furnace in a condition and direction in which substantially all of the combustible constituents of the liquor are burned in suspension, the resultant char and ash falling to the furnace bottom where it is maintained in a relatively shallow bed averaging from about twelve to about eighteen inches in depth. Heretofore self-sustaining combustion conditions have been difficult to maintain and as a result the smelted chemicals frequently became solidified in the furnace bottom. No chemical reducing action is required in the bed, and so long as furnace temperature conditions will permit, the inorganic chemicals will flow in a molten condition from the furnace chamber.

In any of the foregoing processes, one of the main considerations is the maintenance of self-sustaining combustion conditions and, in the soda process in particular, the maintenance of high temperature combustion closely adjacent the hearth so as to maintain the deposited smelt in a molten condition for continuous discharge from the furnace.

An object of my invention is therefore directed particularly to improvements in the operation of furnaces wherein the principal fuel is a residual liquor, and wherein the maintenance of high temperature combustion in a particular zone is relatively critical.

Another object is to provide a method of operation applicable to the improved burning of residual or "black" liquor, in general, and more particularly to the burning of concentrated liquor derived from the soda pulp process.

In keeping with the foregoing objects, I propose to discharge the liquor into a combustion chamber in a finely divided, atomized state so as to expose an extensive area of particle surface to an adjoining combustion supporting atmosphere.

An additional object is to discharge the atomized liquor into the chamber in a widely divergent, flat pattern of spray, and to maintain a direction of discharge which will enable combustion to be substantially completed while the liquor is in suspension, without excessive carry-over of chemicals from the furnace, and in the soda process, without appreciable deposition of unburned organic chemical on any boundary surface.

A further object, applicable to the soda process in particular, is to maintain an active combustion zone closely adjacent the hearth so as to provide a continuous discharge from the furnace of molten inorganic chemicals.

A further specific object is an improved method and apparatus whereby atomized liquor of the soda or sulphite process is discharged into the furnace in two or more flat sprays in opposite, and downwardly converging directions, with the median planes of discharge traversing an air admission zone upwardly spaced from the hearth.

My invention also embodies a particular form of fuel atomizing apparatus adapted for continued service with black liquor without plugging and affording economy of operation both as to the fuel and atomizing medium.

My invention also contemplates apparatus for supporting each atomizer in a predetermined position, fixed or adjusted, whereby the required direction of fuel discharge may be attained, and maintained.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described selected embodiments of my invention. While the apparatus of my invention is adapted for use in burning various liquid fuels, the construction and arrangement specifically disclosed is designed for carrying out my improved process of burning soda pulp residual liquor.

Of the drawings:

Fig. 7 is a sectional elevation showing a modified form of atomizer mount;

Fig. 8 is a sectional plan view of parts shown in Fig. 7, taken along line 7—7; and Fig. 9 is a fragmentary longitudinal section showing the construction of a suitable form of atomizer at its fuel discharge end.

Figure 1:
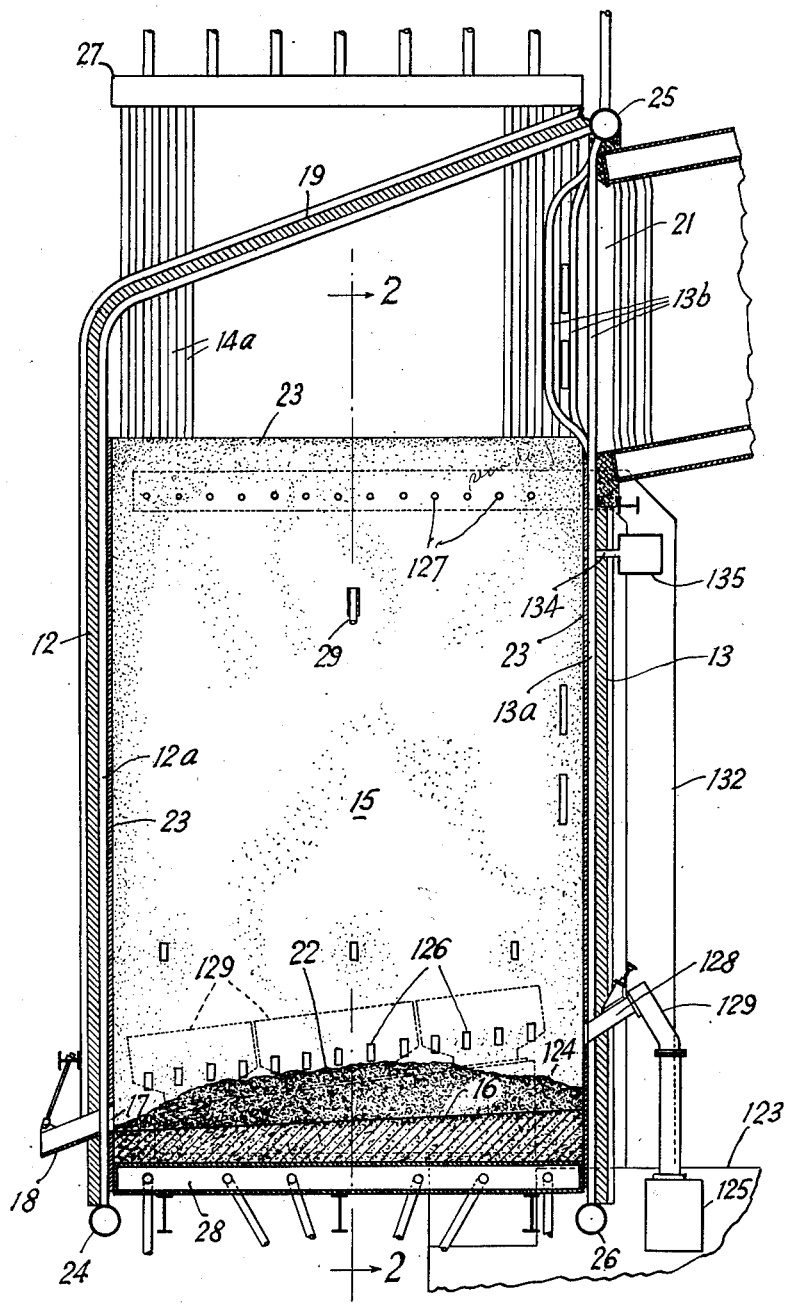
Fig. 1 is a sectional side elevation of a recovery furnace in which my invention is especially adapted for use.
Figure 2:
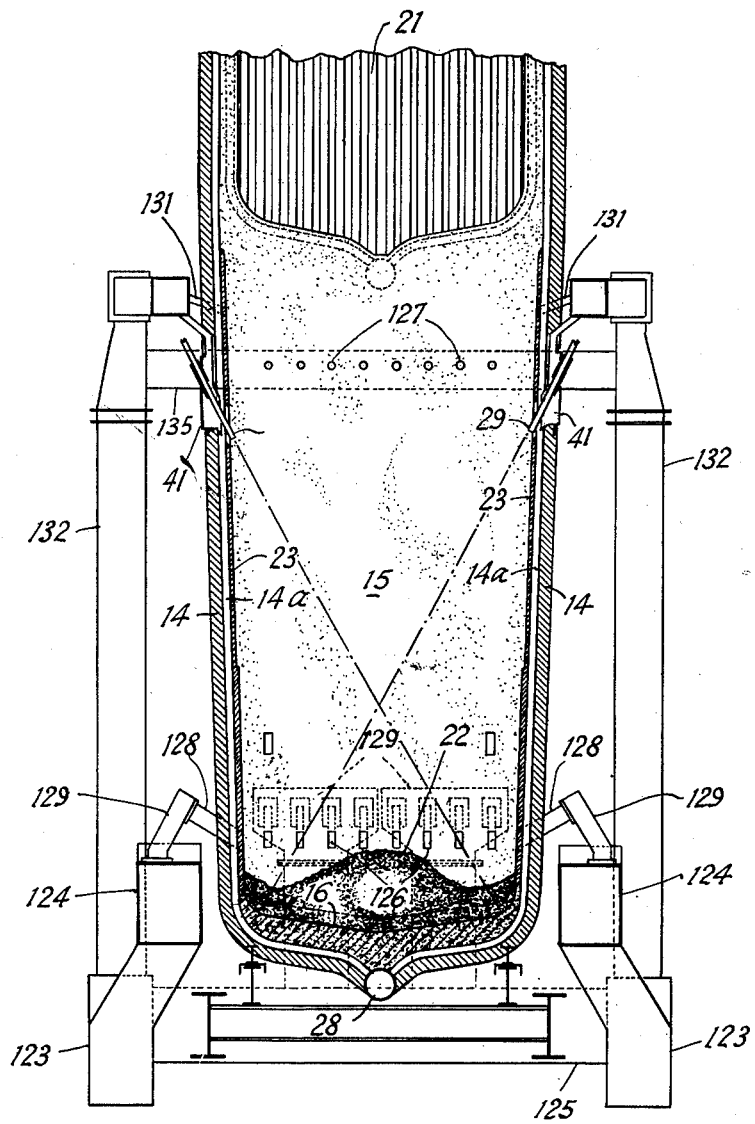
Fig. 2 is a sectional front elevation of the recovery furnace illustrated in Fig. 1, taken along line 2—2.
Figure 5:
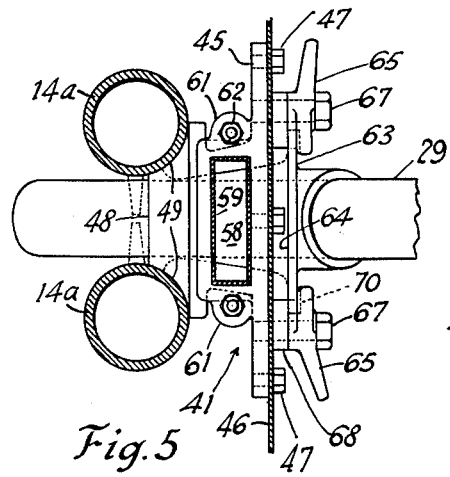
Fig. 5 is a plan view of the apparatus shown in Fig. 4.
Figure 6:
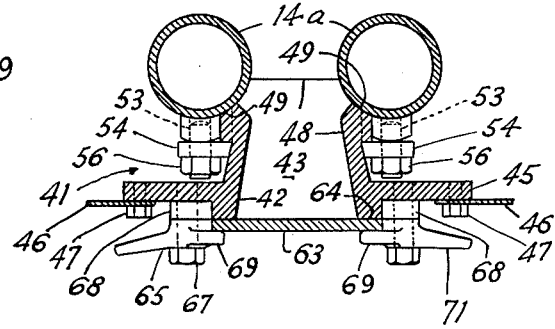
Fig. 6 is a sectional plan of the mount, taken along line 6—6.

As illustrated in Figs. 1 and 2, apparatus suitable for the practice of my invention may include a vertical recovery furnace, and associated heat recovery apparatus, generally of the type and arrangement disclosed in U. S. Patent No. 2,198,446 to L. S. Wilcoxson, issued April 23, 1940. In the structure herein shown, upright fluid cooled front and rear walls 12 and 13, and upright fluid cooled side walls 14, 14, define an interior furnace chamber 15 of rectangular horizontal cross section. The bottom of the furnace is formed by a trough shaped fluid cooled refractory hearth 16 inclined downwardly toward the front wall in which is provided an opening 17 for the discharge of smelt into a smelt spout 18. The upper end of the recovery furnace is closed throughout its area by a rearwardly inclined fluid cooled arch or roof 19. In the upper portion of the rear wall 13 is formed a heating gas outlet 21 through which the heating gases generated in the furnace pass to a steam boiler and other heat recovery apparatus which, although not presently illustrated, may be understood to be arranged as shown in the aforesaid patent, and the flow of gases similarly maintained therethrough under induced draft.

Each of the furnace walls is provided with a row of horizontally spaced upright water tubes 12a, 13a, and 14a, respectively, having suitable provision for supporting an application of plastic refractory material 23 thereon throughout areas directly exposed to combustion temperatures within chamber 15. Front wall tubes 12a extend upwardly along the front wall from a lower transverse header 24, and along the roof arch 19 to an upper transverse header 25. Rear wall tubes 13a extend upwardly along the rear wall from a lower transverse header 26 to the upper transverse header 25 to which front wall tubes 12a are connected, the rear wall tubes having upper end portions 13b arranged to form a screen across the furnace gas outlet 21. Each row of side wall tubes 14a extends upwardly along a side wall to an upper longitudinal header 27, while the lower ends of both rows of tubes 14a are bent inwardly through the hearth structure and connected to a common longitudinally extending header 28. Suitable connections may be provided, similar to those indicated in the patent, whereby the lower headers 24, 26, and 28 are arranged to receive water from the lower drum of a steam boiler, while the upper headers 25 and 27 are connected into an upper drum of the boiler, to provide an upward flow of fluid through the furnace wall tubes. As indicated in Fig. 2, the side walls 14 are arranged to slope outwardly toward their upper ends so as to provide a slightly increasing cross section of chamber in an upward direction.

Figure 4:
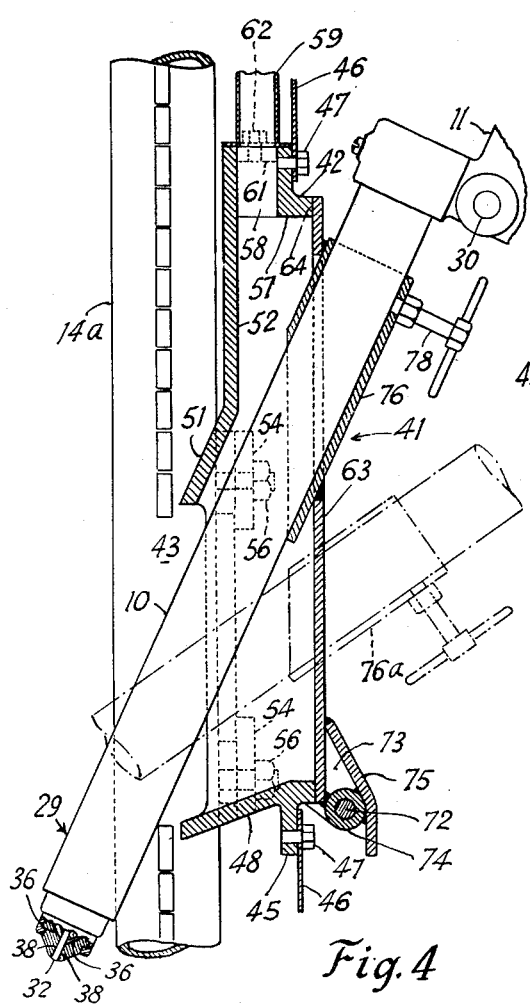
Fig. 4 is a sectional side elevation of the atomizer mount shown in Fig. 3, taken along line 4—4.
Figure 3:
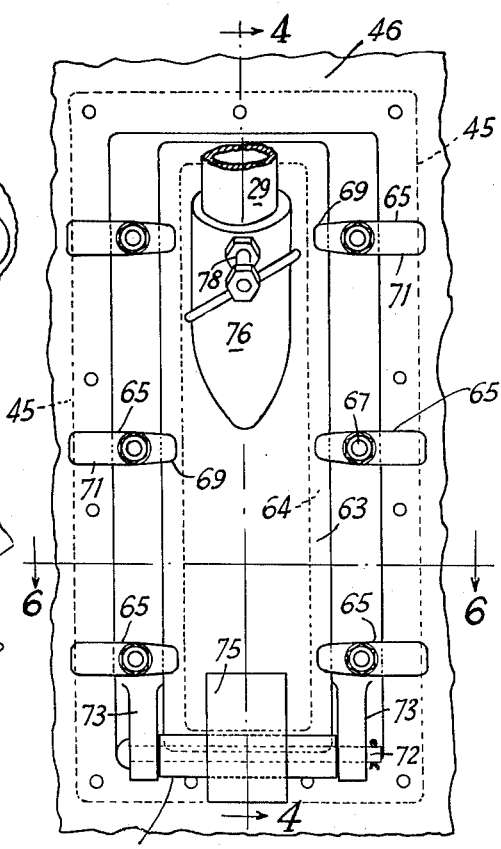
Fig. 3 is a front elevation of an atomizer mount as constructed in accordance with my invention.

The waste liquor to be burned in the furnace is introduced through opposite side walls 14 by means of atomizers 29 of the type illustrated in part in Figs. 4 and 9, and as more fully disclosed, and claimed, in the copending application of James Fletcher, Serial No. 744,891 filed April 30, 1947. Each atomizer 29 is of the fluid-atomizing type and is constructed and arranged so as to discharge the preheated black liquor in an atomized state from a single centrally disposed port 32 in a flat fan-shaped pattern of spray. In more detail, each atomizer comprises an inner tube 31, and a concentrically arranged outer tube or barrel 33, thereby providing a central supply passage 34 for black liquor, and an annular supply passage 35 for a fluid atomizing medium, suitably steam. The barrel 33 is received within a tubular distance piece 10 having its outer end secured to a coupling member 11 which is formed with inlets 20 and 30 for the black liquor and steam, respectively. The black liquor is directed into the centrally disposed sprayer plate port 32, while the steam is directed into port 32 from opposite sides through inclined ports 36, having spaced outlet areas 37, so as to effect atomization of the black liquor for discharge from port 32 as previously described. The fuel port 32 is of generally oblong cross section having parallel side walls 38 equidistant from a median plane, as seen in Fig. 4, and end walls 39 which, as seen in Fig. 9, are parallel to each other adjacent the fuel inlet end, but which are at substantially right angles to each other adjacent the fuel discharge end so as to provide a widely divergent pattern of spray in the median plane of discharge.

Each atomizer 29 is supported in a furnace side wall 14 by means of a mount 41, for example, which maintains the central axis of discharge at a predetermined inclination to the horizontal. As detailed in Figs. 3-6, the mount 41 comprises a vertically elongated rectangular wall frame or box 42 having its central opening 43 opposite the space between adjacent upright wall tubes 14a, and its rectangular lateral flange 45 adjacent the outer face of the wall and to which the wall casing 46 is secured by casing bolts 47. Box 42 is formed with an inwardly projecting continuous rim or collar section 48 terminating in arcuate inner end surfaces 49 fitting the tubes and having its upper transverse portion 51 extending from the back wall 52. The box is secured to the tubes by a known arrangement of studs 53 extending through lugs 54 at both sides and fitted with nuts 56 at their outer ends. The wall 57 forming the top of the box is formed with a rectangular air inlet 58 to which air is delivered under pressure from a suitable source by means of a duct 59 secured to top wall lugs 61 by cap screws 62.

The front of the box is closed by a cover plate or door 63 providing a substantially gas-tight construction, the door 63 seating against a rectangular raised rim 64 surrounding the box opening 43 and being clamped in seated position by lever-like latches 65 pivotally supported on shoulder-type holding bolts 67 screwed into bosses 68 on plate 63, several such latches being spaced along each vertical margin of cover plate 63 and having inner arm portions 69 which bear against the plate, the arm portions 69 having inclined inner surfaces 70 so as to provide a wedging action. The outer arm 71 of each latch 65 serves as a counterweight maintaining the latch clear of the door when rotated from its transverse clamping position.

The front plate 63 is pivotally supported on the box frame 42 by means of a hinge pin 72 extending horizontally through spaced hinge brackets 73 on frame flange 45, and through a sleeve 74 welded or otherwise secured to the door, the strap plate 75, welded to both the plate and the sleeve, contributing to the securement of the sleeve to the door but more particularly serving as a stop-plate adapted to abut the casing 46, within an area backed by flange 45, and thereby limit door opening movement to an approximately horizontal position.

The atomizer 29 is inserted through an integral tubular section 76 of the front plate 63, herein shown as a length of tubing extending through the plate at an acute angle and welded thereto throughout its periphery, the tubular section or sleeve 76 having its inner diameter providing a relatively close fit around the atomizer distance piece 10 which is held stationary by a T-handled set screw 78 bearing against its outer wall. The atomizer 29 is thus removably supported in a predetermined angular relation to the horizontal which for the arrangement shown provides an atomizer inclination of about 65°, this being a practical maximum for a mount proportioned as shown. Lesser degrees of inclination, ranging from about 35° to 65° may be provided by arranging the tubular section 76 at the selected angle, and at a somewhat lower level if necessary to permit the atomizer to clear the upper collar portion 51, as indicated for example by the broken outline 76a. In any of these selected positions the atomizer 29 is spaced throughout from frame 42 so that a small quantity of air from the forced draft supply may be continuously introduced around the atomizer, thereby preventing smelt from accumulating thereon and running down over the tip so as to cause distortion of the spray and possibly cement the atomizer barrel 33 in place within the distance piece 10 so as to interfere with its withdrawal. Moreover, any smelt that might reach the tip is cooled by the air so as to render it brittle and thus more readily removable. The introduction of air in this manner also prevents the escape of fume-laden furnace gases in the vicinity of the mount.

Figs. 7 and 8 show a modified form of mount providing for adjustment of the atomizer inclination in a vertical plane. In this form, the box or frame 80, having an opening 81 registering with an intertube space, and having a lateral flange 82 and an inwardly extending rim or collar section 83, is removably secured to adjacent spaced wall tubes 14a by means of clamping blocks 84 and 85 arranged at opposite sides of the tube row and held in clamping relation to the tubes and collar section by clamping bolts 86. Block 84 is formed with arcuate surfaces 87 engaging the tubes at the inner side of the row, while block 85, at the outer side, is formed with flanged portions 89 engaging a shouldered portion 91 of the frame collar 83 which is formed with tube fitting surfaces 92 at its inner end. In addition to its utility as a clamp, the block 84 serves to close off an appreciable area of opening 81 and thus shields the atomizer and ball support from radiant heat and smelt, the block furthermore providing a chilling surface which freezes any smelt that might accumulate so as to facilitate its removal.

The door or cover 93, having a lateral flange 94 seating against a rim surface 95 surrounding the opening 81, is removably secured to the frame by suitable known means, not shown. The cover 93 includes an integral tubular section 96 disposed in oblique relation thereto and receiving the atomizer 10 which is supported thereby in a ball-and-socket mounting 97 at its outer end. The ball member 98 of the support is seated in a somewhat spherical or conical surface 101, of a diameter less than the diameter of the ball surface, while an annular clamping plate 102, having a similarly formed inner surface 103 bearing against the ball, is removably secured to section 96 by studs 104 and nuts 105. Ball 98 is formed with a central bore 106 in which a tubular element or sleeve 107 is received and seated against an annular shouldered area 108, the atomizer 29 being received within sleeve 107 and being secured against longitudinal and angular displacement by a set screw 109 extending through the wall of the sleeve and bearing against the tubular distance piece 10. The top wall of box 80 is formed with an air inlet 112 through which cooling air may be admitted for introduction around the atomizer as in the previously described embodiment. In this form, the air inlet connection, from a forced draft fan or other suitable source, is provided by the duct 113 formed integrally with the top wall. As shown in Fig. 7, the atomizer 29 is directed at a relatively steep inclination to the horizontal in which position it may be maintained by tightening the clamping bolts 105 associated with the ball-and-socket support 97. Lesser inclinations are available, within a predetermined range and in the same vertical plane, by adjustment of the ball member 98 with respect to the bearing surfaces 101 and 103, in any of which positions, the angularity adjustment may be maintained by nuts 105 as before. Transverse angular adjustments are also available to an extent determined mainly by the spacing of wall tubes 14a.

Resuming description of the furnace and firing arrangement, the atomizers 29, supported in mounts 41 and suitably connected to the waste liquor and steam supplies, are mounted in opposite side walls 14 at substantially equal elevations above the hearth 16, with each atomizer having its longtudinal axis disposed at a relatively steep inclination to the horizontal so as to direct the spray toward a predetermined area of the hearth.

Each atomizer is angularly adjusted in sleeve 76 so as to maintain the elongation of sprayer port 32 substantially horizontal and thereby the median plane of discharge substantially parallel to a horizontal line, each atomizer being adjusted longitudinally so as to maintain a minimum operating clearance between the sprayer port and the inner face of the adjacent refractory lined wall.

In the specific arrangement shown, the longitudinal axis of each atomizer is arranged at a generally minimum operating angle of inclination wherein each such axis is directed toward an area adjacent the opposite wall, substantially at the intersection of the hearth with the opposite wall, as indicated by the intersecting diagonal lines appearing in Fig. 2, the longitudinal atomizer axes intersecting centrally of chamber 15 above the level of air ports 126. The spray from each atomizer may be directed toward hearth areas more nearly adjacent the wall in which the atomizer is mounted by suitable proportioning of mount 41 to provide correspondingly steeper angles of inclination. In a structural embodiment of the invention, the atomizers 29 are suitably positioned midway between the front and rear walls 12 and 13, and at an elevation of about 16 feet above the midpoint of the furnace floor or hearth 16, this elevation applying, for example, to a combustion chamber having a nominal average width of approximately 10 feet, and a nominal depth, front to back, of approximately 14 feet.

The air required for combustion is supplied to chamber 15 at separate elevations therein, above and below the level of atomizers 29. The air supply provisions include a pair of main conduits 123 receiving heated air from a forced draft air heating source, not shown, and discharging to a generally U-shaped wind box system having duct portions 124 and 125 along the side and rear walls respectively. Primary air is introduced adjacent the hearth 16 through vertically elongated ports 126 in each side wall 14, and in rear wall 13, the side wall ports 126 being arranged in rows inclined upwardly to the level of the horizontal row of corresponding rear wall ports. Secondary air is introduced through a row of round ports 127 in each side wall 14 and in rear wall 13, each row being horizontally disposed and above the level of atomizers 29, with each side wall row at a higher level than the rear wall row. The primary air ports 126 are individually fitted with downwardly directed nozzles 128 connected in groups through ducts 129 to air duct portions 124 and 125. The secondary air ports 127 in each side wall are fitted with downwardly directed nozzles 131 connected in a group through a conduit 132 to a main conduit 123, while corresponding ports 127 in the rear wall are fitted with horizontally directed nozzles 134 connected in a group through air ducts 135 and 132 to main conduits 123.

The air ducts 59 conducting air to atomizer mounts 41 are connected to upper horizontal portions of conduits 132 which supply air to secondary air port nozzles 131. The air supply system includes suitable regulating means for controlling delivery of air to the corresponding nozzles.

In the operation of the furnace described, the atomized liquor is discharged into combustion chamber 15 at a considerable distance above the hearth 16, and in steeply inclined downward directions, so as to afford an adequate length of path over which combustion may be completed while the liquor is in suspension, the form of atomizers employed providing sprays of the high degree of particle fineness especially suitable for suspension burning of soda pulp liquor. The velocity of atomized liquor discharge is sufficiently high to cause the sprays to enter and, to a certain extent, traverse the zone of primary air admission adjacent the hearth but, at the same time, sufficiently low to obviate direct impingement of any appreciable amount of spray on any of the chamber walls, including the hearth. Combustion is thus actively maintained in a zone close enough to the hearth to maintain the deposit of smelt in a continuously molten and fluid condition so as to maintain an uninterrupted discharge through opening 17, and thereby a minimum depth of smelt on the hearth.

In the downward flight through chamber 15, the sprayed liquor particles are dehydrated and a considerable portion of the volatile constituents liberated as a result of exposure of the particles to the radiant heat of combustion and their intimate contact with the uprising stream of hot gases, the volatiles passing upwardly through the air admission zone established by the upper series of air ports 127, while the heavier char particles fall to the hearth in suitable condition for burning. The ash particles resulting from combustion of the atomized liquor are deposited on the hearth and together with the char particles form a relatively shallow bed 22 which is maintained at an average depth ranging from about twelve to eighteen inches, as previously mentioned. The deposited ash, as it becomes molten, trickles downwardly through the bed 22 and toward the discharge outlet 17 for continuous removal. The surface of the bed thus presents a substantially continuous exposed area of char which in the presence of air supplied through the lower series of ports 126, from various directions, is readily combustible and provides a glowing surface contributing to stability of combustion within the chamber. In the soda process, in particular, the deposited ash is of a composition, mainly, sodium carbonate, which if allowed to freeze in the bed would provide a substantially non-combustible upper surface preventing combustion of the char content of the bed.

The depth of bed 22 may be controlled by regulating either the supply of air through the lower ports 126, or the supply of steam to the atomizer, or both; an increase in steam flow producing an increased fineness of atomization which results in a greater proportion of the liquor being burned in suspension, and thus a decreased rate of char accumulation in the bed; and an increase in air flow through the lower ports 126 resulting in more rapid combustion of the accumulated char and thus a decrease in bed thickness; the rate of firing being controlled mainly by regulation of the pressure at which the liquor is supplied to the atomizer, without appreciable effect on the shape of the spray. Normally, the bed is maintained at a depth sufficiently shallow to permit free access of air to its upper surface so as to maintain continuous combustion of the char, it being noted that, as indicated in the drawings, the upper bed surface is in general below the level of air ports 126, while its marginal areas, which are in the direct path of the downwardly directed air streams, are burned down to somewhat lesser thicknesses.

While in accordance with the provisions of the statutes I have illustrated and described herein the best form of my invention now known to me, those skilled in the art will understand that changes may be made in the form of the apparatus disclosed without departing from the spirit of the invention covered by my claims, and that certain features of my invention may sometimes be used to advantage without a corresponding use of other features

I claim:

1. In combustion apparatus including a furnace having an upright lateral wall, an atomizer mount in said wall, an atomizer supported in said mount and arranged to spray liquid fuel into said furnace in an inclined downward direction, said atomizer having an elongated cylindrical nozzle extending through an opening in said wall at a horizontally abrupt angle to said wall and terminating in a spray discharge tip adjacent the inner face of said fall, said tip having a spray discharge outlet slot of horizontally elongated cross section in a direction parallel to said furnace wall, said mount comprising a frame having an opening therethrough arranged to pass said atomizer nozzle, a door for said opening having an integral tubular support for said nozzle, a hinge support for said door associated with said frame and arranged for opening and closing movement of said door relative to said frame opening about a horizontal axis disposed below said opening, stop means preventing door opening movement beyond a horizontal plane extending substantially through said axis, and means for clamping said door to said frame in its closed position.

2. In combustion apparatus including a furnace having an upright boundary wall, a substantially gas tight mount in said wall, an atomizer supported in said mount and arranged to spray liquid fuel into said furnace in an inclined downward direction, said atomizer having an elongated cylindrical nozzle extending through an opening in said wall and terminating in a spray discharge outlet slot of horizontally elongated cross section adjacent the inner face of said wall, said mount comprising a frame having an opening therethrough arranged to pass said atomizer nozzle, a door for said opening having a tubular support for said nozzle, and means forming a ball-and-socket mounting for said tubular nozzle support.

3. In combustion apparatus including a furnace having an upright boundary wall formed with horizontally spaced fluid cooling tubes therein providing an inter-tube space between two of said tubes, said apparatus including an atomizer arranged to spray a liquid ash-producing fuel into said furnace in an inclined downward direction away from said wall, said atomizer having an elongated nozzle extending through said wall in alignment with said inter-tube space and terminating in a spray discharge outlet of horizontally elongated cross section in a direction parallel to the inner face of said wall, the combination with said wall which comprises a substantially gas tight atomizer mount having a frame formed with an opening therethrough arranged to pass said atomizer nozzle, a door for said opening having a tubular support for said nozzle, and means for clamping said frame to tubes disposed at opposite sides of said inter-tube space including a metal clamping block in close thermal engagement with furnace side surfaces of said oppositely arranged tubes.

4. In combustion apparatus including a furnace having an upright lateral wall, an atomizer mount in said wall, an atomizer supported in said mount and arranged to spray liquid fuel into said furnace in an inclined downward direction, said atomizer having an elongated nozzle extending through an opening in said wall at a horizontally abrupt angle to said wall and terminating in a spray discharge tip adjacent the inner face of said wall, said tip having a spray discharge outlet slot of horizontally elongated cross section in a direction parallel to said furnace wall, said mount comprising a frame having an opening therethrough arranged to pass said atomizer nozzle, a door for said opening having a support for said nozzle, a hinge support for said door associated with said frame and arranged for opening and closing movement of said door relative to said frame opening about a horizontal axis disposed adjacent the lower margin of said opening, stop means limiting door opening movement to a position in which said door is substantially horizontal, and means for retaining said door in its closed position relative to said frame.

5. In combustion apparatus including a furnace having an upright boundary wall, a substantially gas tight mount in said wall arranged to receive gaseous fluid under pressure, an atomizer supported in said mount and arranged to spray fuel into said furnace in an inclined downward direction, said atomizer having an elongated nozzle extending through an opening in said wall, and terminating in a spray discharge outlet slot of horizontally elongated cross section adjacent the inner face of said wall, said mount comprising a frame having an opening therethrough arranged to pass said atomizer nozzle, and providing space through which said gaseous fluid is discharged into said furnace adjacent said nozzle, a door for said opening having a support for said nozzle, and means forming an angularly adjustable mounting for said nozzle support.

JOHN C. SINGLETON, Jr.

References Cited in the file of this patent

UNITED STATES PATENTS

| Number | Name | Date |
|---|---|---|
| 418,265 | Atwood | Dec. 31, 1889 |
| 450,052 | Bliss et al. | Apr. 7, 1891 |
| 1,621,509 | Humanson et al. | Mar. 22, 1927 |
| 1,771,829 | Wagner | July 29, 1930 |
| 1,881,359 | Jones | Oct. 4, 1932 |
| 1,931,536 | Goodell | Oct. 24, 1933 |
| 2,138,278 | Kernin | Nov. 29, 1938 |
| 2,161,110 | Tomlinson | June 6, 1939 |
| 2,277,946 | Badenhausen | Mar. 31, 1942 |